United States Patent [19]

Meyer et al.

[11] Patent Number: 5,267,319
[45] Date of Patent: Nov. 30, 1993

[54] METHOD AND APPARATUS FOR TROUBLESHOOTING THE STEREO AUDIO CIRCUITS OF A BETA TYPE VCR

[76] Inventors: Corwyn R. Meyer, 3820 Ronning Dr., Sioux Falls, S. Dak. 57103; Scott A. Schlag, 5201 Drexel Dr., Sioux Falls, S. Dak. 57106

[21] Appl. No.: 818,333

[22] Filed: Jan. 9, 1992

[51] Int. Cl.$^5$ .......................................... H04R 29/00
[52] U.S. Cl. ................................................... 381/58
[58] Field of Search .................. 360/19.1; 369/86; 358/330; 455/226.1; 381/58

[56] References Cited

U.S. PATENT DOCUMENTS 3,474,451 10/1969 Abel ................................. 455/103

*Primary Examiner*—Forester W. Isen
*Attorney, Agent, or Firm*—Edmond T. Patnaude

[57] ABSTRACT

A composite test signal which consists of the combination of four audio modulated carriers is developed and injected into the stereo audio circuits of a Beta type VCR. The audio output of the VCR is observed or listened to in order to determine if the circuits downstream of the point of injection of the test signal are operating correctly.

3 Claims, 2 Drawing Sheets

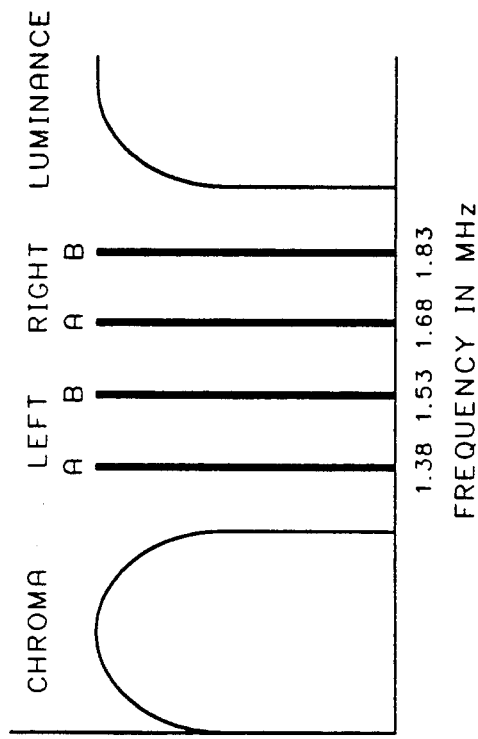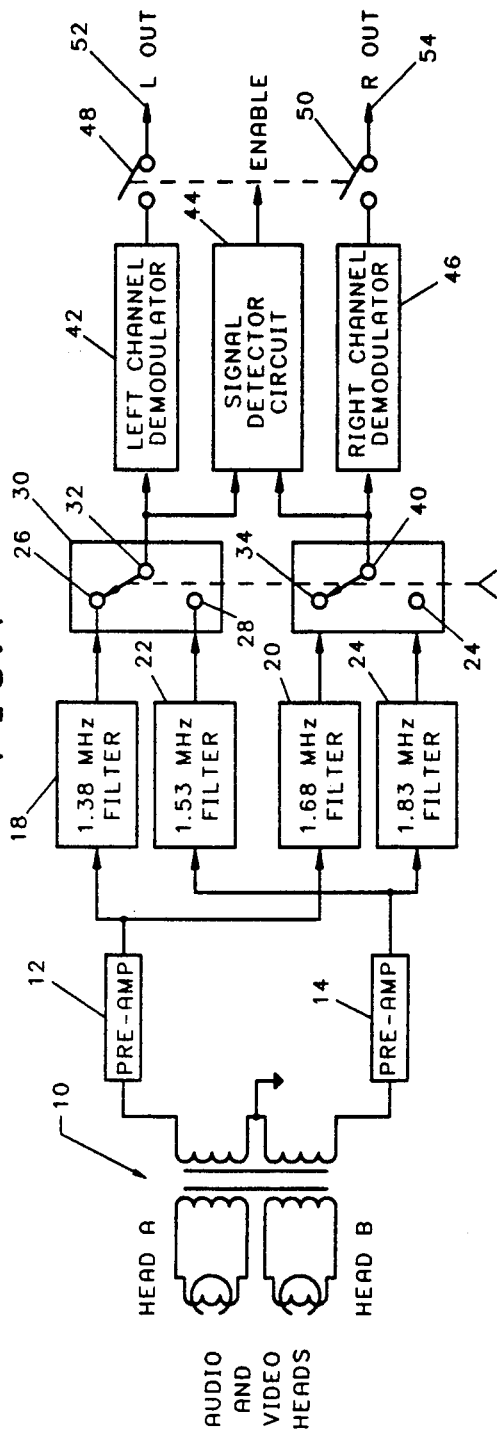

METHOD AND APPARATUS FOR TROUBLESHOOTING THE STEREO AUDIO CIRCUITS OF A BETA TYPE VCR

The present invention relates in general to methods and apparatus for testing audio circuits, and it relates more particularly to a new and improved method and apparatus for troubleshooting the stereo audio circuits of a Beta type VCR by injecting a plurality of audio modulated carriers into the stereo audio circuits of a video cassette recorder and listening to or observing the waveform of the audio output of the recorder to determine if the circuits are functioning correctly.

BACKGROUND OF THE INVENTION

Video cassette recorders are generally called VCRS, and the term, VCR, will be used hereinafter to identify a video cassette recorder. It is a common practise in Beta type VCRs to frequency modulate each of the left and right channel audio signals onto respective ones of a plurality of FM carriers which are subsequently recorded on the video magnetic tape via the same rotating heads that are used to record the associated FM video and chroma information.

There are two different heads which are used for this purpose, one being referred to hereinafter as head A and the other as head B. Only one of these two heads is in operative contact with the tape at any given time. In a conventional Beta type VCR there four different FM audio carriers routed to the heads A and B. These carriers are respectively at frequencies of 1.38 MHz, 1.53 MHz, 1.68 MHz, and 1.83 MHz. The 1.38 MHz and the 1.53 MHz carriers are frequency modulated by the left channel audio signal while the 1.68 MHz and the 1.83 MHz carriers are frequency modulated by the right channel audio signal. The FM modulated 1.38 MHz and the 1.68 MHz carriers are connected to the head A and the 1.53 MHz and 1.83 MHz carriers are connected to the head B.

One method which is currently being used to troubleshoot the stereo audio circuits of a Beta type VCR is simply to analyze the signals at different places in the audio circuits with the aid of an oscilloscope. While signal analysis works well when examining the demodulated audio signals after the demodulators inasmuch as these audio signals are relatively distinct and uncomplicated. However, the audio modulated FM carriers are complex and difficult to analyze. In addition, these modulated signals are switched at a frequency of 30 Hz, making it still more difficult to analyze the modulated signal by simply observing it on an oscilloscope. For example, if a circuit has an input but no output, it is apparent that the circuit is defective. If, on the other hand, there is an output but it is incorrect yet beyond the technician's ability to determine whether is it right or wrong when simply using an oscilloscope, the technician may assume that the circuit is working correctly when in fact it is operating incorrectly.

Moreover, Beta type VCRs include a signal detector circuit which mutes the audio signal in the absence of an output signal from any of the audio circuits thereby to prevent improper audio signals from being passed to any of the output amplifiers and from them to the speakers. This muting function makes analyzing of the stereo audio circuits virtually impossible when the audio circuits are muted and there is no audio output to observe.

SUMMARY OF THE INVENTION

Briefly, there is provided in accordance with the present invention a new and improved method and apparatus for troubleshooting the stereo audio circuits of a Beta type VCR. In this system a composite test signal is injected into the audio circuits at any selected location and the audio output from the VCR is either listened to or observed on the screen of an oscilloscope to determine if the circuits through which the injected signal is passing are functioning correctly.

Although it might seem that the injected test signal should be Identical to that which can be recorded on tape, using such a signal would make it difficult, if not impossible, to provide the audio test signal at the left and right channel outputs since the timing of the switching of the four audio carriers has to be precise in order for the signal detector to allow the demodulated audio signals to be passed to the output amplifiers. This means that the injected audio carriers would have to be connected to a switch to allow only one set of carriers through at a time, and that switch would have to be synchronized with the correct phase of the 30 Hz head switch signal in the VCR.

In accordance with the teachings of the present invention, there is provided a composite test signal which Includes all four of the frequency modulated audio carriers normally present In a Beta type VCR system. These carriers need not be switched at the 30 Hz rate, and the composite signal can be injected anywhere in the VCR circuit ahead of the audio demodulators.

By using this composite injection signal, the signal detector circuit will not disable the audio circuits of the VCR. This is because all four FM carriers are present at the same time, and therefore, the appropriate carriers will always be present at the inputs of the signal detector at the correct time thus permitting the audio circuits to function at all times.

GENERAL DESCRIPTION OF THE DRAWINGS

A better and more complete understanding of the present invention may be had from a reading of the following detailed description taken in connection with the accompanying drawing wherein:

FIG. 1 shows the frequency spectrum of a Beta type VCR;

FIG. 2 is a block diagram of a typical Beta type stereo audio playback system;

DETAILED DESCRIPTION OF THE INVENTION

Figure 3:
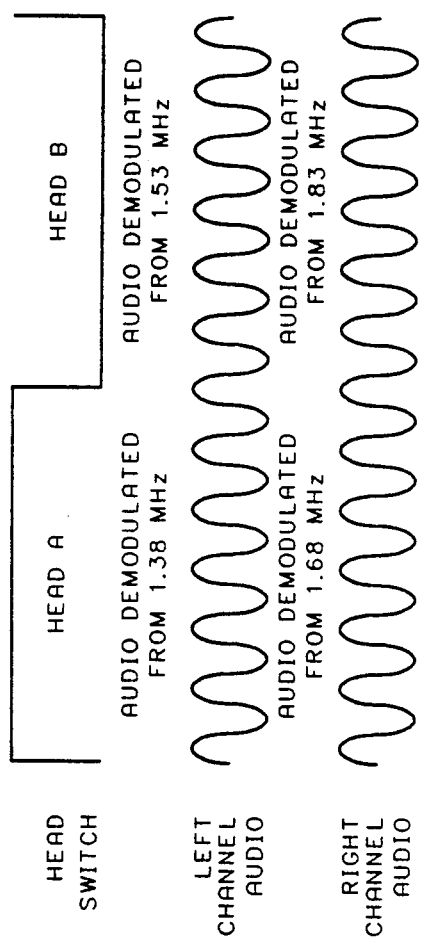
FIG. 3 shows the waveforms of the outputs of the left and right channel demodulators as they relate to the operation of the associated head switch.

Referring to FIG. 1, there will be seen the frequency spectrum of a Beta type system including the video and audio information. At lower end of the spectrum is located the chroma band which contains the chroma information, and at the upper end of the spectrum is located the luminance band which contains the luminance information. Between the chroma and luminance bands is the audio band where four audio modulated FM carriers are located. The left channel audio signal is frequency modulated on a 1.38 MHz carrier and on a 1.53 MHz, these carriers being respectively designated A and B in FIG. 1. The right channel audio signal is frequency modulated on a 1.68 MHz carrier and on a 1.83 MHz carrier. These carriers are also designated A and B in FIG. 1 to show which carrier is modulated with the signal from the head A and which carrier is modulated with the signal from the head B.

Referring to FIG. 2, the audio and video heads of a Beta type VCR are designated Head A and Head B. When the VCR Is in the playback mode, the heads A and B are used to pick up the FM modulated carriers from the magnetic tape, and the FM modulated carriers are coupled through a rotary transformer 10 to a pair of amplifiers 14 and 16 referred to herein as pre-amps. The signal from head A is coupled to the pre-amp 14 while the signal from the head B is coupled to the pre-amp 16. A head switch in the VCR, not shown, is controlled by a 30 Hz head switch control signal which alternately moves the heads A and B into contact with the magnetic tape at the rate of 30 Hz. Only one of the heads A and B is in contact with the magnetic tape at any time. When the head A is in contact with the tape, the audio modulated 1.38 MHz and 1.68 MHz carriers are picked up and amplified by the pre-amp 14. When the head B is in contact with the tape, the audio modulated 1.53 MHz and 1.83 carriers are picked up and amplified by the pre-amp 16.

The output of the pre-amp 14 is coupled to a first bandpass filter 18 and to a second bandpass filter 20. The passbands of the filters 18 and 20 are relatively narrow and are respectively centered at 1.38 MHz and 1.68 MHz. In like manner, the output of the pre-amp 16 is coupled to a pair of bandpass filters 22 and 24 which are respectively centered at 1.53 MHz and 1.83 MHz. The outputs of the filters 18 and 22 are respectively connected to a pair of switch contacts 26 and 28 of a switch 30 having a wiper connected to a common terminal 32. In like manner the outputs of the filters 20 and 24 are coupled to a pair of switch contacts 34 and 36 of a switch 38 having a wiper connected to a common terminal 40. The switches 30 and 38 are under the control of the 30 Hz head switch signal so as to operate in synchronism with the movement of the heads A and B into contact with the tape. The common terminal 32 of the switch 30 is connected to the inputs of a left channel demodulator 42 and a signal detector circuit 44. The common terminal 40 of the switch 38 is connected to the inputs of a right channel demodulator 46 and the signal detector circuit 44. A pair of switches 48 and 50 are controlled by the output of the signal detector circuit 44 and are respectively and serially connected between the output terminals of the demodulators 42 and 46 and the left and right channel outputs 52 and 54. The switches 48 and 50 are closed by the signal detector circuit 44 when a signal is present at either of the switch terminals 32 and 40 and are opened in the absence of a signal at either of the switch terminals 32 and 40.

Referring to FIG. 3, It may be seen that while the head A is in contact with the tape the outputs of the demodulator is an audio signal from the left channel demodulator 42 and an audio signal from the right channel demodulator 46 with the audio signal continuing when the head B is in contact with the tape with no interruption in the audio signal as one head moves into contact with the tape and the other moves away from the tape.

Figure 4:
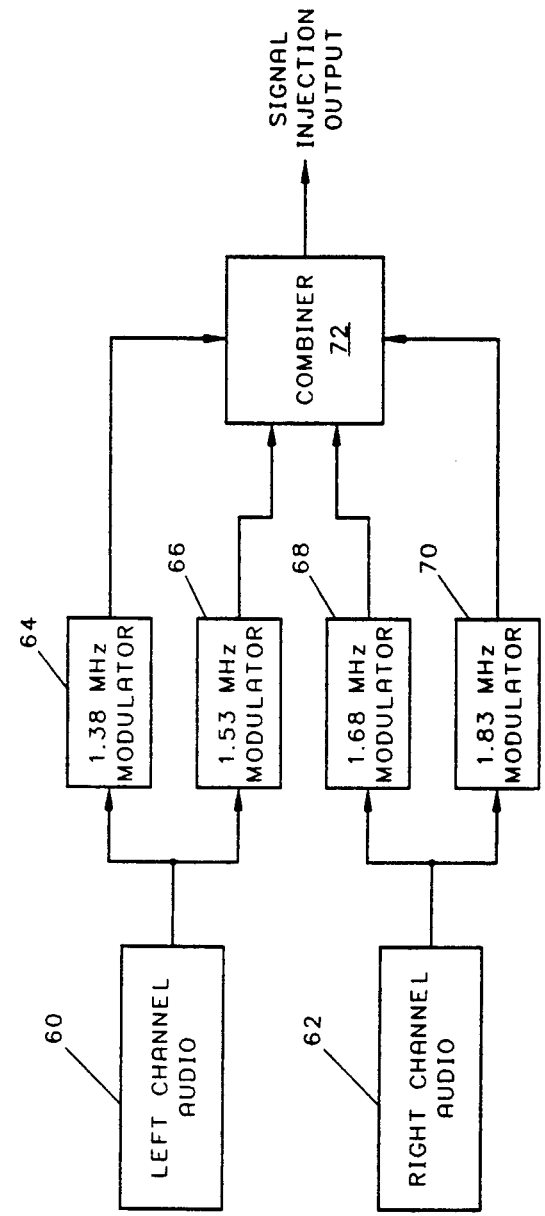
FIG. 4 is a block diagram of an injection signal generator embodying the present invention.

Referring to FIG. 4, a source of a left channel audio frequency signal is identified by the number 60, and the source of a right channel audio frequency signal is identified by the number 62. The signal from the source 50 is coupled to first and second frequency modulators 64 and 66, which respectively modulate a 1.38 MHz carrier and a 1.53 MHz carrier with the audio signal from the source 60. In like manner, the output of the source 62 is coupled to the inputs of a pair of third and fourth frequency modulators 68 and 70 which frequency modulate a 1.68 MHz carrier and a 1.83 MHz carrier with the audio test signal from the source 62. The outputs from the modulators 64, 66, 68, and 70 are coupled to a combiner 72 which combines all four of the outputs of the modulators 64, 66, 68, and 70 to provide a composite test signal for injection into the audio circuits of a Beta type VCR. This composite test signal consists of a 1.38 MHz carrier frequency modulated with the left channel audio test signal, a 1.53 MHz carrier frequency modulated with the left channel audio test signal, a 1.68 MHz carrier frequency modulated with the right channel audio test signal, and a 1.83 MHz carrier frequency modulated with the right channel audio test signal. The audio test signal is preferably an audio frequency sine wave.

In order to test a Beta type VCR such as the one shown in FIG. 2, the technician will inject the composite test signal at any point in the audio circuits of the VCR ahead of the demodulators 42 and 44. If the audio test signal is present at the appropriate one of the outputs 52 and 54, it is known that the channel on which the signal is present is working properly. If the audio test signal is not present at the appropriate output 52 or 54, or if the audio test signal is distorted, the technician should then select a point in the circuit farther ahead toward the demodulator. In this way, any problem in the audio circuits of the VCR can be easily and quickly isolated and found.

Inasmuch as all of the carrier frequencies are present at all times in the composite injection signal, a signal is always present at the input of the signal detection circuit 44, and the switches 48 and 50 thus remain closed at all times unless the entire VCR circuitry is defective. Synchronizing of the carriers with the 30 MHz head switch signal is thus obviated.

While the present invention has been described in connection with particular embodiments thereof, it will be understood that those skilled in the art may make many changes and modifications therein with departing from the true spirit and scope of the invention. Therefore, it is intended by the appended claims to cover all such changes and modifications which come within the true spirit and scope of the invention.

What is claimed:

1. A method of testing the stereo audio circuits of a Beta type VCR, said audio circuits including a plurality of audio demodulators, comprising the steps of
    providing a composite test signal including a plurality of simultaneously occurring FM carriers respectively modulated with an audio test signal,
    injecting said composite test signal into said audio circuits of said VCR ahead of said audio demodulators of said VCR, and
    comparing the audio output of said VCR to said audio test signal to determine if the audio circuits of said VCR downstream of the point of injection of said composite test signal are operating correctly.

2. The method according to claim 1, wherein said FM carriers are at respective frequencies of 1.38 MHz, 1.53 MHz, 1.68 MHz, and 1.83 MHz.

3. Apparatus for generating a test signal for use in testing the stereo audio circuits of a Beta type VCR, comprising in combination means for generating an audio test signal, means for generating four carriers, having respective frequencies of 1.38 MHz, 1.53 MHz, 1.68 MHz, and 1.83 MHz, modulating means for modulating said audio test signal onto said carriers, and means for combining the outputs of said modulating means to provide said test signal.

* * * * *

UNITED STATES PATENT AND TRADEMARK OFFICE
CERTIFICATE OF CORRECTION

PATENT NO. : 5,267,319

DATED : November 30, 1993

INVENTOR(S) : Meyer et al

It is certified that error appears in the above-identified patent and that said Letters Patent is hereby corrected as shown below:

In column 1, line 31, after "there" insert --are--.

In column 1, line 39, after "to" delete "the".

In column 1, line 41, beginning of the line, delete "the".

In column 1, line 56, after "whether" delete "is" and after "it" insert --is--.

In column 2, line 13, after "be" delete "Identical" and substitute --identical--.

In column 2, line 27, beginning of the line, delete "Includes" and substitute --includes--.

In column 2, line 28, after "present" delete "In" and substitute --in--.

In column 2, line 67, after "1.53MHz" insert --carrier--.

In column 3, line 6, after "audio" delete "and" and substitute --/--.

In column 3, line 12, after "amplifiers" delete "14" and substitute --12-- and after "and" delete "16" and substitute --14--.

UNITED STATES PATENT AND TRADEMARK OFFICE
CERTIFICATE OF CORRECTION

PATENT NO. : 5,267,319

DATED : November 30, 1993

INVENTOR(S) : Meyer et al

It is certified that error appears in the above-identified patent and that said Letters Patent is hereby corrected as shown below:

In column 3, line 13, after "pre-amp" delete "14" and substitute --12--.

In column 3, line 14, after "pre-amp" delete "16" and substitute --14--.

In column 3, line 19, beginning of the line, delete "and" and substitute --or--.

In column 3, line 22, after "pre-amp" delete "14" and substitute --12--.

In column 3, line 24, after "1.83" insert --MHz--.

In column 3, line 25, after "pre-amp" delete "16" and substitute --14--.

In column 3, line 26, after "pre-amp" delete "14" and substitute --12--.

In column 3, line 30, after "pre-amp" delete "16" and substitute --14--.

In column 3, line 57, after "the" second occurrence, delete "outputs" and substitute --output--.

In column 3, line 68, after "source" delete "50" and substitute --60--.

UNITED STATES PATENT AND TRADEMARK OFFICE
CERTIFICATE OF CORRECTION

PATENT NO. : 5,267,319

DATED : November 30, 1993

INVENTOR(S) : Meyer et al

It is certified that error appears in the above-identified patent and that said Letters Patent is hereby corrected as shown below:

```
In column 4, line 26, after "and" delete "44" and
substitute --46--.

In column 4, line 41, after "30" delete "MHz" and
substitute --Hz--.
```

Signed and Sealed this

Twentieth Day of December, 1994

Attest:

BRUCE LEHMAN

Attesting Officer

Commissioner of Patents and Trademarks